United States Patent
Shiraki et al.

[11] Patent Number: 4,990,559
[45] Date of Patent: Feb. 5, 1991

[54] THERMOPLASTIC RESIN COMPOSITION

[75] Inventors: Takeshi Shiraki, Yamaguchi; Kunie Hiroshige; Iwatosi Suzuki, both of Iwakuni, all of Japan

[73] Assignee: Mitsui Petrochemical Industries, Ltd., Tokyo, Japan

[21] Appl. No.: 479,288

[22] Filed: Feb. 13, 1990

[30] Foreign Application Priority Data

Feb. 14, 1989 [JP] Japan .................... 1-34618

[51] Int. Cl.$^5$ ................ C08L 23/04; C08L 45/00
[52] U.S. Cl. .................... 524/518; 525/210
[58] Field of Search ................ 525/210; 524/518

[56] References Cited

U.S. PATENT DOCUMENTS

| 4,874,808 | 10/1989 | Minami et al. | 525/210 |
| 4,918,133 | 4/1990 | Moriya et al. | 525/210 |
| 4,931,520 | 6/1990 | Yamanashi et al. | 525/210 |
| 4,933,393 | 6/1990 | Toyota et al. | 525/240 |

FOREIGN PATENT DOCUMENTS 214137 10/1984 Fed. Rep. of Germany ...... 525/210

Primary Examiner—Carman J. Seccuro
Attorney, Agent, or Firm—Sherman and Shalloway

[57] ABSTRACT

A thermoplastic resin composition composed of

[A] 5 to 90% by weight of a linear polyolefin having an intrinsic viscosity [μ], measured in decalin at 135° C., of 1.0 to 15.0 and a crystallinity of at least 45% and formed substantially of from 8 to 40% of an ultrahigh-molecular-weight polyolefin having an intrinsic viscosity [μ], determined at 135° C., of 10 to 40 dl/g and 60 to 92% of a low-molecular-weight to high-molecular-weight polyolefin having an intrinsic viscosity [μ], measured in decalin at 135° C., of 0.1 to 5.0 dl/g, and

[B] 95 to 10% by weight of at least one type of cyclo-olefin resin having an intrinsic viscosity, measured in decalin at 135° C., of 0.05 to 10 dl/g and a softening temperature of at least 70° C. and selected from ring-opened polymers and ring-opened copolymers derived from cyclo-olefins represented by the following formula [I],

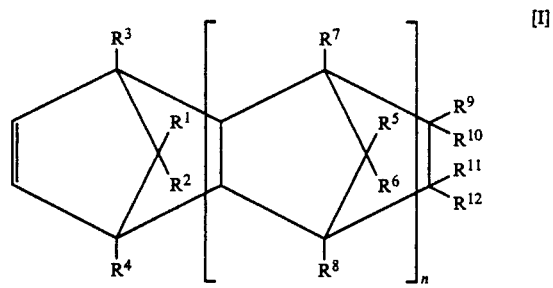

wherein n is 0 or a positive integer, $R^1$ to $R^{12}$, independently from each other, represent an atom or a group selected from the class consisting of a hydrogen atom, halogen atoms and hydrocarbon groups, $R^9$ to $R^{12}$ may be linked to each other to form a monocyclic or polycyclic group which may have a double bond, and $R^9$ and $R^{11}$, or $R^{10}$ and $R^{12}$, may each form an alkylidene group, hydrogenated products of said polymers or copolymers, and addition polymers of ethylene with the cyclo-olefins of formula [I]. The composition is suitable for obtaining molded articles having self-lubricating property, molding dimensional stability, heat resistance and rigidity in a well-balanced combination.

15 Claims, No Drawings

THERMOPLASTIC RESIN COMPOSITION

BACKGROUND OF THE INVENTION

1. Field of the Invention

This invention relates to a thermoplastic resin composition suitable for obtaining articles having self lubricating property, dimensional stability, thermal resistance and rigidity in a well-balanced combination.

2. Description of the Prior Art

Since polyolefins having an ultrahigh molecular weight, for example polyethylene having an ultrahigh molecular weight, in comparison with general-purpose polyolefins such as polystyrene, have a weak intramolecular cohesive force, a symmetrical molecular structure and a high crystallinity, they have excellent sliding property, impact strength, abrasion resistance and tensile strength, and can be used, for example, as a sliding material. However, because of their high molecular weights, they are difficult to shape, and in many cases, ultrahigh-molecular-weight polyethylene which is in widespread use is difficult to shape by general conventional methods.

Various proposals have been made to impart excellent moldability to ultrahigh-molecular-weight polyolefins without impairing their excellent properties.

For example, Japanese Laid-Open Patent Publication No. 12606/1988 discloses an injection-moldable polyolefin composition comprising 15 to 40 parts by weight of an ultrahigh-molecular-weight polyolefin having an intrinsic viscosity [$\eta$], measured in decalin at 135° C., of 10 to 40 dl/g and 85 to 60 parts by weight of a polyolefin having a low to a high molecular weight and an intrinsic viscosity, measured in decalin at 135° C., of 0.1 to 5 dl/g. This composition is innovative in that in spite of its inclusion of an ultrahigh-molecular-weight polyolefin, it can be injection-molded, and molded articles obtained by injection-molding have the excellent slidability and moldability of the ultrahigh-molecular-weight polyolefin. However, this injection-molded article tends to shrink during molding, and it is still necessary to improve the shrinkage of the molded articles.

Furthermore, Japanese Patent Publication No. 144351/1985, for example, discloses a thermoplastic resin composition having excellent abrasion resistance and impact strength and a high limited PV value which is obtained by melt-kneading 70 to 98% by weight of a thermoplastic resin selected from the group of polyamides, polyacetals, polyesters and polycarbonates and 30 to 2% by weight of an ultrahigh-molecular-weight polyethylene powder having a specific particle diameter distribution.

Japanese Laid-Open Patent Publication No. 175069/1988 discloses an additive for improving the abrasion resistance of syntheic resins such as polyamides, polyacetals, polyesters and polycarbonates, said additive comprising 90 to 10% by weight of an ultrahigh-molecular-weight polyethylene component having an intrinsic viscosity [$\mu$], measured at 135° C. in decalin, of at least 6 dl/g, and 10 to 90% by weight of a polyethylene component having an intrinsic viscosity, measured at 135° C., of 0.1 to 5 dl/g.

SUMMARY OF THE INVENTION

It is an object of this invention to provide a thermoplastic resin composition suitable for obtaining shaped articles having improved molding dimensional stability and a well-balanced combination of self lubricating property, molding dimensional stability, thermal resistance and rigidity while retaining the inherent excellent mechanical properties of the ultra-high-molecular-weight polyethylene.

This object is achieved in accordance with this invention by a thermoplastic resin composition comprising as essential resin components

[A] 5 to 90% by weight of a linear polyolefin having an intrinsic viscosity [$\eta$], measured in decalin at 135° C., of 1.0 to 15.0 dl/g and a crystallinity of at least 45% and formed substantially of from 8 to 40% of an ultrahigh-molecular-weight polyolefin having an intrinsic viscosity [$\eta$], determined at 135° C., of 10 to 40 dl/g and 60 to 92% of a low-molecular-weight to high-molecular-weight polyolefin having an intrinsic viscosity measured in decalin at 135° C., of 0.1 to 5.0 dl/g,

[B] 95 to 10% by weight of at least one type of cyclo-olefin resin having an intrinsic viscosity, measured at 135° C. in decalin, of 0.05 to 10 dl/g and a softening temperature of at least 70° C. and selected from ring-opened polymers and ring-opened copolymers derived from cyclo-olefins represented by the following formula [I],

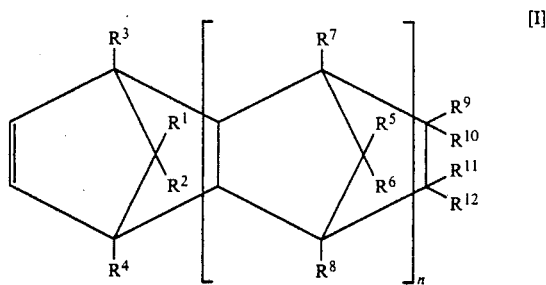

wherein n is 0 or a positive integer, $R^1$ to $R^{12}$, independently from each other, represent an atom or a group selected from the class consisting of a hydrogen atom, halogen atoms and hydrocarbon groups, $R^9$ to $R^{12}$ may be linked to each other to form a monocyclic or polycyclic group which may have a double bond, and $R^9$ and $R^{11}$, or $R^{10}$ and $R^{12}$, may each form an alkylidene group, hydrogenated products of said polymers or copolymers, and addition polymers of ethylene with the cyclo-olefins of formula I).

DETAILED DESCRIPTION OF THE PREFERRED EMBODIMENTS

The thermoplastic resin composition of this invention comprises as essential resinous components 5 to 90% by weight of the linear polyolefin [A] and 95 to 10% by weight of the cyclo-olefin resin [B].

The linear polyolefin [A] is a polyolefin substantially formed from (i) 8 to 40% by weight of an ultrahigh-molecular-weight polyolefin having an intrinsic viscosity, measured in decalin at 135° C., of 10 to 40 dl/g, and (ii) 60 to 92% by weight of a low-molecular-weight to high-molecular-weight polyolefin having an intrinsic viscosity, measured in decalin at 135° C., of 0.1 to 5.0 dl/g. This linear polyolefin [A] has a crystallinity of at least 45%, and an intrinsic viscosity, measured in decalin at 135° C., of 1.0 to 15.0 dl/g.

The cyclo-olefin resin [B] is selected from ring-opened polymers or copolymers derived from the cyclo-olefins of formula [I], hydrogenation products of the polymers or copolymers, and addition polymers of ethylene with cyclo-olefins of formula [I]. The cyclo-olefin resin has an intrinsic viscosity, measured in decalin at 135° C., of 0.05 to 10 dl/g and a softening temperature of at least 70° C.

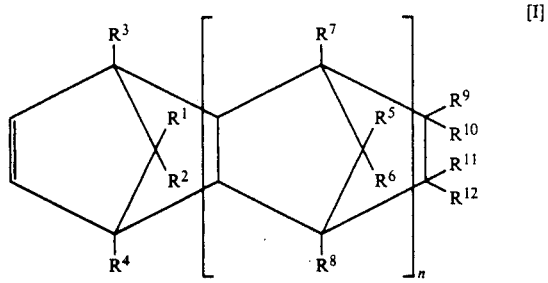

wherein n is 0 or a positive integer: $R^1$ to $R^{12}$, independently from each other, represent an atom or a group selective from a hydrogen atom, halogen atoms and hydrocarbon groups, $R^9$ to $R^{12}$ may be linked to each other to form a monocyclic or polycyclic group which may have a double bond; and $R^9$ and $R^{11}$ or $R^{10}$ and $R^{12}$ each may form an alkylidene group. The thermoplastic resin composition of the invention will be specifically described. The thermoplastic resin composition of this invention comprises a linear polyolefin and a cyclo-olefin resin.

Linear Polyolefin [A]

The linear polyolefin [A] used in this invention is formed of an ultrahigh-molecular-weight polyolefin and a low-molecular-weight to a high molecular-weight polyolefin. These constituent polyolefins will be described. The ultrahigh-molecular-weight polyolefin (i) and the low-molecular-weight or high-molecular-weight polyolefin (ii) are a homopolymer or a copolymer of an alpha-olefin such as ethylene, propylene, 1-butene, 1-pentene, 1-hexene, 1-octene, 1-decene, 1-dodecene, 4-methyl-1-pentene and 3-methyl-1-pentene. Particularly preferably, the polyolefin (i) or (ii) is a homopolymer of ethylene and/or a copolymer of ethylene with another alpha-olefin, and it is preferable to use a copolymer comprising ethylene as a main component.

The ultrahigh-molecular-weight polyolefin constituting the linear polyolefin [A] has an intrinsic viscosity [$\eta$], measured in decalin at 135° C., of 10 to 40 dl/g, preferably 25 to 35 dl/g.

The low-molecular-weight to high-molecular-weight polyolefin has an intrinsic viscosity [$\eta$], measured in decalin at 135° C., of 0.1 to 5 dl/g, preferably 0.5 to 3 dl/g. By using ultrahigh-molecular-weight polyolefins having an intrinsic viscosity within the above range, injection-molded articles having excellent mechanical properties and appearance can be obtained.

By using the low-molecular-weight to high-molecular-weight polyolefins having an intrinsic viscosity within the above range, the injection-moldability of the thermosetting resin composition is increased.

The linear polyolefin [A] comprises the ultrahigh-molecular-weight polyolefin and the low-molecular-weight to high-molecular-weight polyolefin in specific proportions. Specifically, it contains 8 to 40% by weight, preferably 10 to 30% by weight, of the ultrahigh-molecular-weight polyolefin and 60 to 92% by weight, preferably 70 to 90% by weight, of the low-molecular-weight to high-molecular-weight polyolefin.

By adjusting the proportions of the ultrahigh-molecular-weight polyolefin and the low-molecular-weight to the high-molecular-weight polyolefin to the above range, a composition is obtained from which molded articles having good mechanical properties can be obtained.

The linear polyolefin [A] consists substantially of the ultrahigh polyolefin and the low-molecular-weight to the high-molecular-weight polyolefin. Hence, the total proportion of the ultrahigh-molecular-weight and the low- to high-molecular-weight polyolefin becomes 100%.

The linear polyolefin [A] consisting substantially of the ultrahigh-molecular-weight polyolefin (i) and the high- to low-molecular-weight polyolefin (ii) has a crystallinity of at least 45%, preferably at least 55%, especially preferably at least 65%.

The linear polyolefin [A] has an intrinsic viscosity [$\eta$], measured in decalin at 135° C., of 1.0 to 15.0 dl/g, preferably 2.5 to 10.0 dl/g, especially preferably 3.0 to 7.0 dl/g. Since the linear polyolefin [A] has a crystallinity within the above range, the coefficient of dynamic friction of molded articles prepared from the composition becomes low, and a molded article having excellent self-lubricating property can be obtained. Furthermore, since the linear polyolefin [A] has an intrinsic viscosity within the above range, the state of dispersion of the linear polyolefin [A] and the cyclo-olefin resin [B] becomes good. The two components are finely and uniformly dispersed. By using this resin composition, molded articles having excellent appearance, self-lubricating property and dimensional accuracy can be obtained.

The linear polyolefin [A] may be prepared by producing the ultrahigh-molecular-weight polyolefin and the low-molecular-weight to high-molecular-weight polyolefin separately and mixing them. Advantageously, however, it can be directly prepared by polymerizing olefins in a multiplicity of steps in the presence of a catalyst prepared from a specific active solid titanium catalyst component and an organoaluminum compound catalyst composition. This polymerization method will be described hereinbelow as "multistep polymerization method".

The multistep polymerization method comprises polymerizing olefins in a multiplicity of steps in the presence of a Ziegler-type catalyst formed from a highly active titanium catalyst component (a) and an organoaluminum compound catalyst component (b). Specifically, in one polymerization step, an ultrahigh-molecular-weight polyolefin having an intrinsic viscosity of 10 to 40 dl/g is formed, and in another polymerization step, an olefin is polymerized in the presence of hydrogen to give a low-molecular-weight to high-molecular-weight polyolefin having an intrinsic viscosity of 0.1 to 5.0 dl/g.

The Ziegler-type catalyst used is basically a catalyst having specific properties formed from a solid titanium catalyst component and an organoaluminum compound catalyst component.

The solid titanium catalyst component is preferably a highly active finely divided catalyst component composed of several fine globules having a narrow particle size distribution and an average particle diameter of about 0.01 to 5 micrometers. Such a highly active fine titanium catalyst component having such properties may be produced, for example in accordance with the method disclosed in Japanese Laid-Open Patent Publication No. 811/1981 in which in the preparation of a solid titanium catalyst component, a magnesium compound as a solution is contacted with a liquid titanium compound to precipitate a solid product under strictly controlled precipitating conditions. Specifically, in the method disclosed in Japanese Laid-Open Patent Publication No. 811/1981, a hydrocarbon solution of magnesium chloride and a higher alcohol is mixed with titanium tetrachloride at a low temperature and the resulting mixed solution is heated to about 50° to 100° C. under intense stirring conditions in the presence of a minor amount (about 0.01 to 0.2 mole) of a monocarboxylic acid ester per mole of magnesium chloride to precipitate a solid product. This gives a highly active finely divided titanium catalyst component. If further required, the precipitated solid product (solid catalyst component) may be washed with titanium tetrachloride.

In this manner, a solid catalyst component having high activity with an excellent condition of particles can be obtained. This solid catalyst component contains, for example, about 1 to about 6% by weight of titanium and has a halogen/titanium atomic ratio of from about 5 to about 90 and a magnesium/titanium atomic ratio of from about 4 to about 50.

Fine globules having a narrow particle size distribution and an average particle diameter of 0.01 to 5 micrometers, preferably 0.05 to 3 micrometers, obtained by shearing a slurry of the above-prepared solid titanium catalyst component at a high speed may also be preferably used as a highly fine titanium catalyst component. Specifically, there can be used a method of treatment by which the slurry of the solid titanium catalyst component is treated in an inert gaseous atmosphere by a homomixer for a proper period of time. At this time, an organoaluminum compound in an amount equimolar to titanium may be added in advance. The addition of an organoaluminum compound in this way can prevent the catalyst performance from being degraded. There may also be used a method in which the treated slurry is classified with a sieve to remove coarse particles. By these methods, the highly active finely divided titanium catalyst component having a small particle size can be obtained.

The linear polyolefin [A] used in this invention may be produced by slurry polymerization of olefins in at least two polymerization steps at a temperature of usually 0° to 100° C. in a hydrocarbon medium such as pentane, hexane, heptane or kerosene in the presence of the highly active finely divided titanium catalyst component (a) and the organoaluminum compound catalyst component (b) and if required, an electron donor.

Examples of the organoaluminum compound catalyst component (b) are preferably trialkyl aluminums such aluminum chlorides such as diisobutyl aluminum chloride and alkyl aluminum sesquichlorides such as ethyl aluminum sesquichlorides, and mixtures of these.

To perform multistep polymerization of olefins, a multistep polymerization step consisting of at least two polymerization vessels which are connected in series is used. For example, a two-step polymerization method, a three-step polymerization method and an n-step polymerization may be used. It is also possible to perform multistep polymerization with one polymerization vessel by using a batchwise polymerization process. In at least one polymerization vessel, a specific amount of an ultrahigh-molecular-weight polyolefin must be necessary. The step in which the ultrahigh-molecular-weight polyolefin is to be produced may be the first-step polymerization step or an intermediate polymerization step, or two or more steps. Preferably, the ultrahigh-molecular-weight polyolefin may be produced in the first polymerization step because the polymerization operation is easy, and the properties of the polyolefin obtained are easy to control. It is critical that in the above polymerization step, 8 to 40% by weight of the linear polyolefin [A] consists of an ultrahigh-molecular-weight polyolefin having an intrinsic viscosity $[\eta]$, measured in decalin at 135° C., of 10 to 40 dl/g. Preferably 10 to 35%, especially 15 to 25% by weight, of the linear polyolefin [A] consists of an ultrahigh-molecular-weight polyolefin having an intrinsic viscosity of 15 to 35 dl/g, particularly 25 to 35 dl/g.

In the multistep polymerization process, the polymerization is carried out in the presence of a catalyst composed of the highly active titanium catalyst component (a) and the organoaluminum compound catalyst component (b). The polymerization may be carried out by the vapor-phase polymerization method, or the liquid phase polymerization method. By either of these methods, the polymerization step of producing the ultrahigh-molecular-weight polyolefin is carried out in the presence of an inert medium as required. For example, the vapor-phase polymerization method may be carried out in the presence of, as required, a diluent. The liquid phase polymerization method may be carried out in the presence of, as required, an inert medium.

In the polymerization step of forming the ultrahigh-molecular-weight polyolefin, it is suitable to use the highly active titanium catalyst component (a) in an amount of about 0.001 to about 20 milligrams, preferably about 0.005 to about 10 milligrams, of titanium atom per liter of the medium, and the organoaluminum compound catalyst component (b) in an amount corresponding to an Al/Ti atomic ratio of about 0.1 to about 1000, particularly from about 1 to about 500. The temperature used in the polymerization step of producing the ultrahigh-molecular-weight polyolefin is usually about $-20°$ to about 120° C., preferably about 0° to about 100° C., particularly preferably from about 5° to about 95° C. The pressure for the polymerization reaction is, for example, atmospheric pressure to about 100 kg/cm$^2$, preferably atmospheric pressure to about 50 kg/cm$^2$, under which the liquid-phase polymerization or the vapor-phase polymerization can be carried out. The polymerization time in the polymerization step may be set at such a period of time during which the amount of the polyolefin formed is at least 1000 g, preferably at least about 2000 g, per milligram atom of titanium in the highly active titanium catalyst component. To produce the ultrahigh-molecular-weight polyolefin in the polymerization step, the polymerization step is preferably carried out in the presence of hydrogen. After the polymerization reaction, it is possible to isolate the resulting polymer in an atmosphere of an inert medium, and store it.

Examples of the inert medium that can be used in the polymerization step of producing the ultrahigh molecular weight polyolefin include aliphatic hydrocarbons such as propane, butane, pentane, hexane, heptane, octane, decane and kerosene; alicyclic hydrocarbons such as cyclopentane and cyclohexane; aromatic hydrocarbons such as benzene, toluene and xylene; halogenated hydrocarbons such as dichloroethane, methylene chloride and chlorobenzene; and mixtures of these hydrocarbons. The use of aliphatic hydrocarbons is particularly desirable.

To produce the linear polyolefin A used in this invention, the polymerization reaction of remaining olefins is carried out in the presence of hydrogen in the step of forming the low-molecular-weight to high-molecular-weight polyolefin. If the step of forming the ultrahigh-molecular-weight polyolefin is the first-step polymerization, the second or subsequent step corresponds to the above step. If that step is after the step of producing the ultrahigh-molecular-weight polyolefin, a polyolefin containing the ultrahigh-molecular-weight polyolefin is fed into that step. If that step is after a polymerization step other than the step of producing the ultrahigh-molecular-weight polyolefin, the low-molecular-weight to high-molecular-weight polyolefin produced in the previous step is fed. In either case, the polymerization is continued. In that step, the starting olefins and hydrogen are usually fed. If that step is the first step of the process, the catalyst composed of the highly active titanium catalyst component (a) and the organoaluminum compound (b) is fed. If that step is the second step, the catalyst contained in the polymer solution produced in the previous step may be used as it is, or if required, the highly active titanium catalyst component (a) and/or the organoaluminum compound (b) may be additionally supplied. weight polyolefin so obtained exists in an amounts of 60 to 92% by weight, preferably 65 to 90% by weight, especially preferably 75 to 85% by weight, based on the entire olefin components to be polymerized in the entire steps.

The proportion of hydrogen to be fed in a polymerization step other than the step of forming the ultrahigh-molecular-weight polyolefin is usually 0.008 to 0.04 mole, preferably 0.010 to 0.03 mole, per mole of the olefin.

The concentrations of the catalyst components in the polymer solution in the polymerization vessel in the polymerization step other than the polymerization step of forming the ultrahigh-molecular-weight polyolefin are preferably adjusted such that per liter of the volume of the polymerization zone, the concentration of the above-treated catalyst, calculated as titanium atom, is about 0.001 to 0.1 milligram-atom, preferably about 0.005 to about 0.1 milligram-atom, and the Al/Ti atomic ratio in the polymerization system is from about 1 to about 1000, preferably from about 2 to about 500. For this purpose, the organoaluminum compound catalyst component (b) may be additionally used, as required. To adjust the molecular weight and the molecular weight distribution of the resulting polymer, hydrogen, an electron donor and a halogenated hydrocarbon may also be caused to be present together in the polymerization system.

The polymerization temperature may be within a range of temperatures at which slurry polymerization and vapor-phase polymerization can be carried out and may be at least about 40° C., preferably from about 50° to about 100° C. Preferably, the polymerization pressure is, for example, atmospheric pressure to about 100 kg/cm$^2$, especially atmospheric pressure to about 50 kg/cm$^2$. Desirably, the polymerization time is set so that the amount of the polymer formed becomes at least about 1000 g, especially at least about 5000 g, per milligram-atom of titanium in the titanium catalyst component.

The polymerization step other than the polymerization step of forming the ultrahigh-molecular-weight polyolefin may be carried out by the vapor-phase polymerization or the liquid-phase polymerization. Different polymerization may of course be used in different polymerization steps. As the liquid-phase polymerization method, the slurry suspension polymerization is preferably used. In any case, the polymerization reaction in the polymerization step is usually carried out in the presence of an inert medium. For example, the vapor phase polymerization method is carried out in the presence of an inert medium diluent, and the liquid-phase slurry suspension polymerization method is carried out in the presence of an inert medium solvent. The inert medium may be any of those inert media exemplified hereinabove with regard to the polymerization step of producing the ultrahigh-molecular-weight polyolefin.

The polymerization reaction is performed such that the linear polyolefin obtained in the final polymerization step may have an intrinsic viscosity of usually 1.0 to 15 dl/g, preferably 3.0 to 7.0 dl/g.

The multistep polymerization method described above may be carried out batchwise, semi-continuously or continuously.

Examples of the olefins to which the above described multistep polymerization method is applicable include alpha-olefins such as ethylene, propylene, 1-butene, 1-pentene, 1-hexene, 1-octene, 1-decene, 1-dodecene, 4-methyl-1-pentene and 3-methyl-1-pentene. The multistep polymerization method may be applied to the production of homopolymers of these alpha-olefins or to the production of copolymers of a mixture of two or more of such alpha-olefins. In particular, it is preferable to apply the process of this invention to the production of a polymer of ethylene or a copolymer of ethylene with another alpha-olefin, comprising ethylene as a main component.

Cyclo-Olefin Resin [B]

The cyclo-olefin resin [B] constituting the thermoplastic resin composition of this invention is at least one type of resin selected from the group consisting of ring-opened polymers or ring-opened copolymers derived from cyclo-olefins represented by the following formula I], hydrogenation products of these polymers or copolymers, and addition polymers of ethylene with the cyclo-olefins of formula [I].

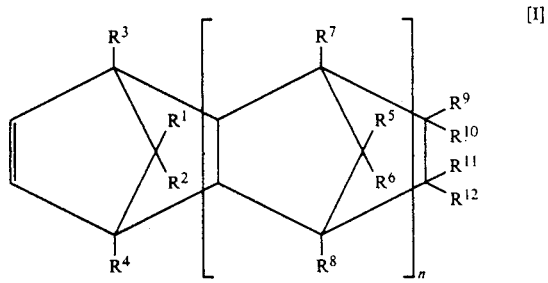

In the above formula [I], n is 0 or a positive integer; $R^1$ to $R^{12}$, independently from each other, represent a hydrogen atom, a halogen atom or a hydrocarbon group; and $R^9$ to $R^{12}$ may be linked to each other to form a monocyclic or a polycyclic group, which may have a crosslinked structure and may further contain a double bond. These rings may be combined to each other.

Specifically, $R^9$ to $R^{12}$ may together form the following monocyclic or polycyclic groups.

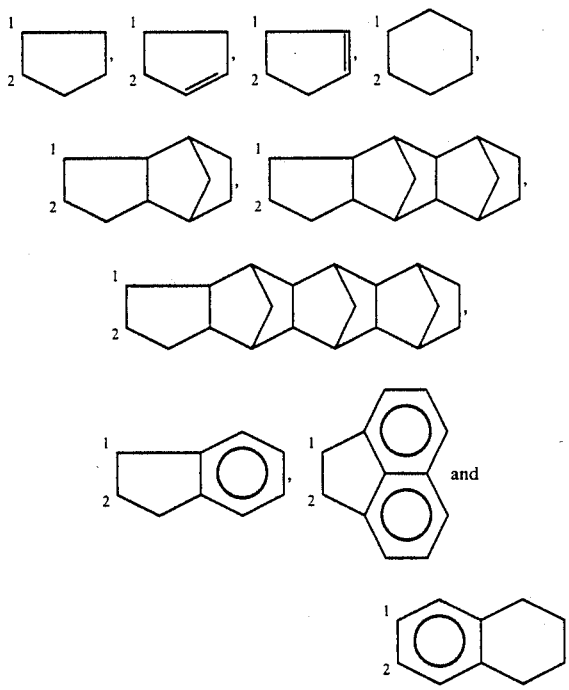

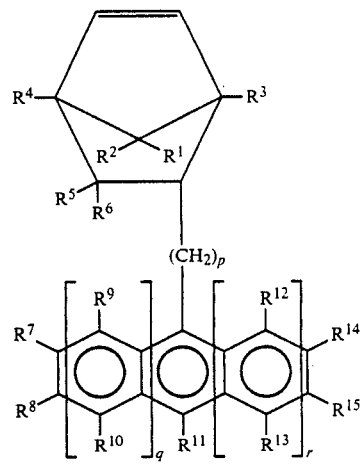

In the above formulae, the carbon atoms marked t the carbon atoms of an alicyclic structure to which the groups $R^9$ to $R^{12}$ are bonded in formula [I]. Furthermore, these groups may have a substituent such as a methyl group.

$R^9$ and $R^{11}$, or $R^{10}$ and $R^{12}$ may each form an alkylidene group. Furthermore, $R^9$ to $R^{12}$ may include an ester group.

Of these cyclo-olefins, cyclo-olefins of formula II) are preferred.

In formula [II-a], p is 0 or an integer of at least 1; q and r are 0, 1 or 2; $R^1$ to $R^{16}$, independently from each other, represent atoms or groups selected from a hydrogen atom, halogen atoms, aliphatic hydrocarbon groups, aromatic hydrocarbon groups and alkoxy groups; and $R^5$ (or $R^6$) and $R^8$ (or $R^7$) may be bonded directly or via an alkyl group having 1 to 3 carbon atoms.

The cyclo-olefins of formula [I] or preferably formula [I] or [II-a], can be easily produced by condensing cyclopentadienes with the corresponding olefins or cycloolefins by the Diels-Alder reaction. Examples of the cyclo-olefins of formula I]used in this invention include
bicyclo2,2,1hept-2-ene derivatives,
tetracyclo[4,4,0,1$^{2,5}$,1$^{7,10}$]-3-dodecene derivatives,
hexacyclo[6,6,1,1$^{3,6}$1$^{10,13}$,0$^{2,7}$,0$^{9,14}$]-4-heptadecene derivatives,
octacyclo[8,8,0,1$^{2,9}$,1$^{4,7}$,1$^{11,18}$,1$^{13,16}$0$^{3,8}$,0$^{12,17}$]-5-docosene derivatives,
pentacyclo[6,6,1,1$^3$ ,6$0^{2,7}$,0$^{9,14}$]-4-hexadecene derivatives

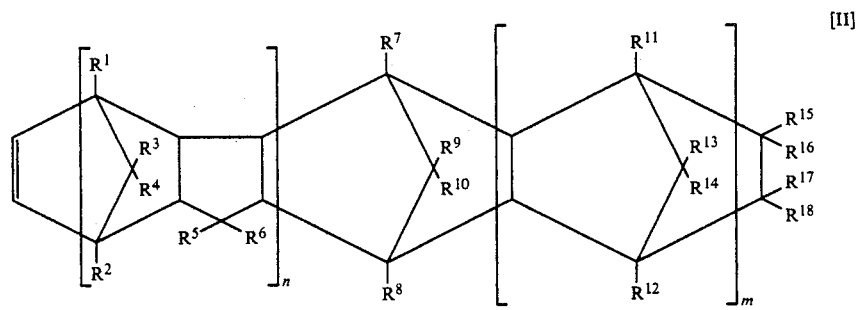

In formula [II], n is 0 or 1, and m is 0 or a positive integer; $R^1$ to $R^{18}$, independently from each other, represent atoms or groups selected from the class consisting of a hydrogen atom, halogen atoms and hydrocarbon groups; $R^{15}$ to $R^{18}$ may be linked to each other to form a monocyclic or polycyclic group which may have a double bond; and $R^{15}$ and $R^{17}$, or $R^{16}$ and $R^{18}$ may each form an alkylidene group.

The cyclo-olefins used as materials for producing olefin polymers having an alicyclic structure in this invention may also include compounds represented by the following formula [II-a].

heptacyclo-5-eicosene derivatives,
heptacyclo-5-heneicosene derivatives,
tricyclo[4,3,0,1$^{2,5}$]-3-decene derivatives,
tricyclo4,3,0,1$^{2,5}$]-3-undecene derivatives,
pentacyclo[6,5,1,1$^{3,6}$,0$^2$ $^{7}$,0$^{9,13}$]-4-pentadecene derivatives,
pentacyclopentadecadiene derivatives,
pentacyclo[4,7,0,1$^{2,5}$,0$^{8,13}$,1$^{9,12}$]-3-pentadecene derivatives,
heptacyclo[7,8,0,1$^{3,6}$,0$^{2,7}$,1$^{10,17}$,0$^{11,16}$,1$^{12,15}$]-4-eicosene derivatives, and nonacyclo[9,10,1,1$^{4,7}$,0$^{3,8}$,0$^{2,10}$,0$^{12,21}$,1$^{13,20}$,0$^{14,19}$,1$^{15,18}$]-5-pentacosene derivatives.

---

(1) <u>bicyclo[2,2,1]hept-2-ene derivatives</u> such as

 bicyclo[2,2,1]hept-2-ene

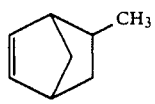 6-methylbicyclo[2,2,1]-hept-2-ene

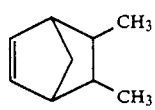 5,6-dimethylbicyclo-[2,2,1]hept-2-ene

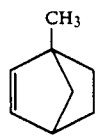 1-methylbicyclo-[2,2,1]hept-2-ene

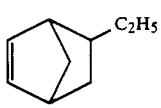 6-ethylbicyclo-[2,2,1]hept-2-ene

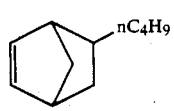 6-n-butylbicyclo-[2,2,1]hept-2-ene

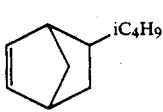 6-isobutylbicyclo-[2,2,1]hept-2-ene

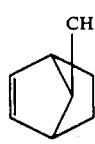 7-methylbicyclo[2,2,1]-hept-2-ene (2) <u>tetracyclo[4,4,0,1$^{2,5}$,1$^{7,10}$]-3-dodecene derivatives</u> such as

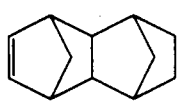 tetracyclo[4,4,0,1$^{2,5}$,1$^{7,10}$]-3-dodecene

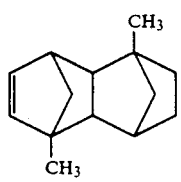 5,10-dimethyltetracyclo-[4,4,0,1$^{2,5}$,1$^{7,10}$]-3-dodecene

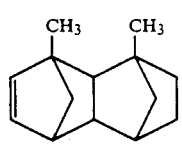 2,10-dimethyltetracyclo-[4,4,0,1$^{2,5}$,1$^{7,10}$]-3-dodecane

-continued

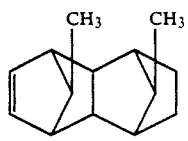
11,12-dimethyltetracyclo-[4,4,0,1$^{2,5}$,1$^{7,10}$]-3-dodecane

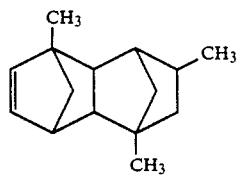
2,7,9-trimethyltetracyclo-[4,4,0,1$^{2,5}$,1$^{7,10}$]-3-dodecene

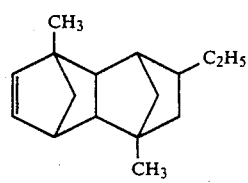
9-ethyl-2,7-dimethyltetra-cyclo[4,4,0,1$^{2,5}$,1$^{7,10}$]-3-dodecene

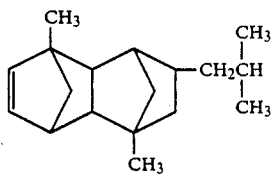
9-isobutyl-2,7-dimethyl-tetracyclo[4,4,0,1$^{2,5}$,1$^{7,10}$]-3-dodecene

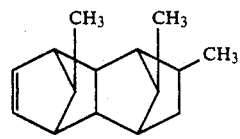
9,11,12-trimethyltetra-cyclo[4,4,0,1$^{2,5}$,1$^{7,10}$]-3-dodecene

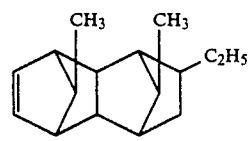
9-ethyl-11,12-dimethyl-tetracyclo[4,4,0,1$^{2,5}$,1$^{7,10}$]-3-dodecene

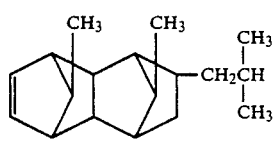
9-isobutyl-11,12-dimethyl-tetracyclo[4,4,0,1$^{2,5}$,1$^{7,10}$]-3-dodecene

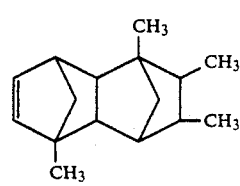
5,8,9,10-tetramethyl-tetracyclo[4,4,0,1$^{2,5}$,1$^{7,10}$]-3-dodecene

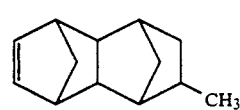
8-methyltetracyclo-[4,4,0,1$^{2,5}$,1$^{7,10}$]-3-dodecene

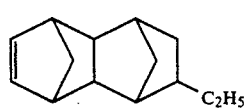
8-ethyltetracyclo-[4,4,0,1$^{2,5}$,1$^{7,10}$]-3-dodecene

-continued

| Structure | Name |
|---|---|
| (structure with C₃H₁₇) | 8-propyltetracyclo-[4,4,0,1$^{2,5}$,1$^{7,10}$]-3-dodecene |
| (structure with C₆H₁₃) | 8-hexyltetracyclo-[4,4,0,1$^{2,5}$,1$^{7,10}$]-3-dodecene |
| (structure with C₁₈H₃₇) | 8-stearyltetracyclo-[4,4,0,1$^{2,5}$,1$^{7,10}$]-3-dodecene |
| (structure with two CH₃) | 8,9-dimethyltetracyclo[4,4,0,1$^{2,5}$,1$^{7,10}$]-3-dodecene |
| (structure with CH₃ and C₂H₅) | 8-methyl-9-ethyltetracyclo[4,4,0,1$^{2,5}$,1$^{7,10}$]-3-dodecene |
| (structure with Cl) | 8-chlorotetracyclo-[4,4,0,1$^{2,5}$,1$^{7,10}$]-3-dodecene |
| (structure with Br) | 8-bromotetracyclo-[4,4,0,1$^{2,5}$,1$^{7,10}$]-3-dodecene |
| (structure with F) | 8-fluorotetracyclo-[4,4,0,1$^{2,5}$,1$^{7,10}$]-3-dodecene |
| (structure with two Cl) | 8,9-dichlorotetracyclo-[4,4,0,1$^{2,5}$,1$^{7,10}$]-3-dodecene |
| (structure with cyclohexyl) | 8-cyclohexyltetracyclo-[4,4,0,1$^{2,5}$,1$^{7,10}$]-3-dodecene |
| (structure with CH₂CH(CH₃)CH₃) | 8-isobutyltetracyclo-[4,4,0,1$^{2,5}$,1$^{7,10}$]-3-dodecene |
| (structure with C₄H₉) | 8-butyltetracyclo-[4,4,0,1$^{2,5}$,1$^{7,10}$]-3-dodecene |
| (structure with =CHCH₃) | 8-ethylidenetetracyclo-[4,4,0,1$^{2,5}$,1$^{7,10}$]-3-dodecene |

-continued

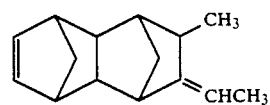 8-ethylidene-9-methyltetra-cyclo[4,4,0,1$^{2,5}$,1$^{7,10}$]-3-dodecene

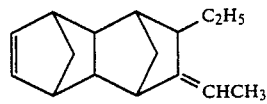 8-ethylidene-9-ethyltetra-cyclo[4,4,0,1$^{2,5}$,1$^{7,10}$]-3-dodecene

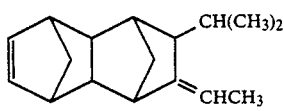 8-ethylidene-9-isopropyl-tetracyclo[4,4,0,1$^{2,5}$, 1$^{7,10}$]-3-dodecene

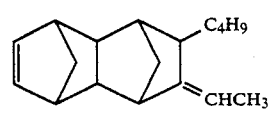 8-ethylidene-9-butyltetra-cyclo[4,4,0,1$^{2,5}$,1$^{7,10}$]-3-dodecene

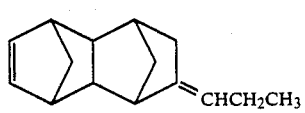 8-n-propylidenetetra-cyclo[4,4,0,1$^{2,5}$,1$^{7,10}$]-3-dodecene

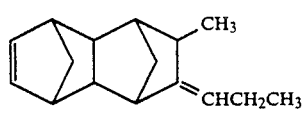 8-n-propylidene-9-methyl-tetracyclo[4,4,0,1$^{2,5}$, 1$^{7,10}$]-3-dodecene

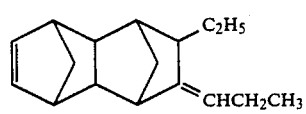 8-n-propylidene-9-ethyl-tetracyclo[4,4,0,1$^{2,5}$, 1$^{7,10}$]-3-dodecene

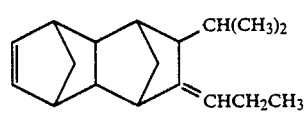 8-n-propylidene-9-iso-propyltetacyclo[4,4,0,1$^{2,5}$, 1$^{7,10}$]-3-dodecene

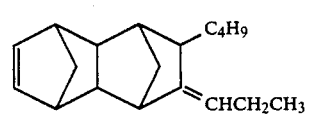 8-n-propylidene-9-butyl-tetracyclo[4,4,0,1$^{2,5}$, 1$^{7,10}$]-3-dodecene

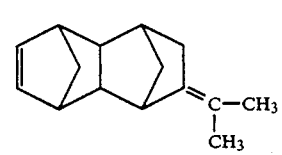 8-isopropylidene-tetra-cyclo[4,4,0,1$^{2,5}$,1$^{7,10}$]-3-dodecene

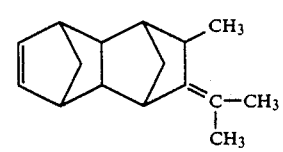 8-isopropylidene-9-methyl-tetracyclo[4,4,0,1$^{2,5}$, 1$^{7,10}$]-3-dodecene

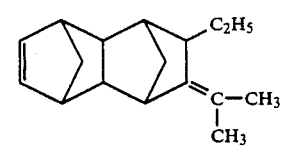 8-isopropylidene-9-ethyl-tetracyclo[4,4,0,1$^{2,5}$, 1$^{7,10}$]-3-dodecene -continued

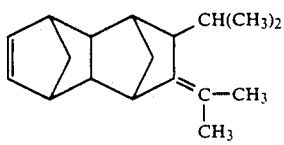 8-isopropylidene-9-isopropyltetracyclo[4,4,0,1$^{2,5}$,1$^{7,10}$]-3-dodecene

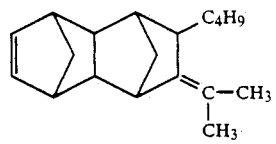 8-isopropylidene-9-butyltetracyclo[4,4,0,1$^{2,5}$,1$^{7,10}$]-3-dodecene (3) hexacyclo[6,6,1,1$^{3,6}$,1$^{10,13}$,0$^{2,7}$,0$^{9,14}$]-4-heptadecene derivatives
such as

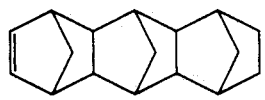 hexacyclo[6,6,1,1$^{3,6}$,1$^{10,13}$,0$^{2,7}$,0$^{9,14}$]-4-heptadecene

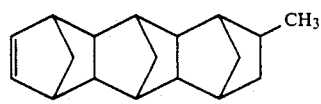 12-methylhexacyclo[6,6,1,1$^{3,6}$,1$^{10,13}$,0$^{2,7}$,0$^{9,14}$]-4-heptadecene

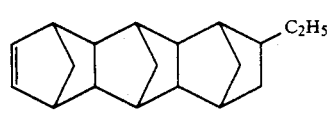 12-ethylhexacyclo[6,6,1,1$^{3,6}$,1$^{10,13}$,0$^{2,7}$,0$^{9,14}$]-4-heptadecene

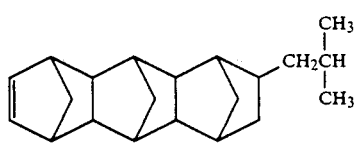 12-isobutylhexacyclo[6,6,1,1$^{3,6}$,1$^{10,13}$,0$^{2,7}$,0$^{9,14}$]-4-heptadecene

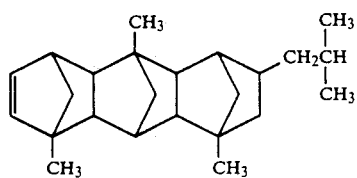 1,6,10-trimethyl-12-isobutylhexacyclo[6,6,1,1$^{3,6}$,1$^{10,13}$,0$^{2,7}$,0$^{9,14}$]-4-heptadecene (4) octacyclo[8,8,0,1$^{2,9}$,1$^{4,7}$,1$^{11,18}$,1$^{13,16}$,0$^{3,8}$,0$^{12,17}$]-5-docosene derivatives
such as

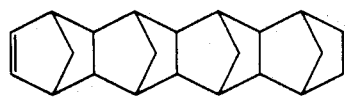 octacyclo[8,8,0,1$^{2,9}$,1$^{4,7}$,1$^{11,18}$,1$^{13,16}$,0$^{3,8}$,0$^{12,17}$]-5-docosene

 15-methyloctacyclo[8,8,0,1$^{2,9}$,1$^{4,7}$,1$^{11,18}$,1$^{13,16}$,0$^{3,8}$,0$^{12,17}$]-5-docosene

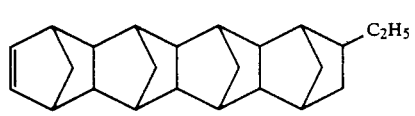 15-ethyloctacyclo[8,8,0,1$^{2,9}$,1$^{4,7}$,1$^{11,18}$,1$^{13,16}$,0$^{3,8}$,0$^{12,17}$]-5-docosene (5) pentacyclo[6,6,1,1$^{3,6}$,0$^{2,7}$,0$^{9,14}$]-4-hexadecene derivatives
such as

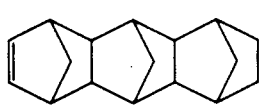 pentacyclo[6,6,1,1$^{3,6}$,0$^{2,7}$,0$^{9,14}$]-4-hexadecene

-continued

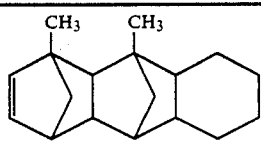 1,3-dimethylpentacyclo-
[6,6,1,1$^{3,6}$,0$^{2,7}$,0$^{9,14}$]-4-
hexadecene

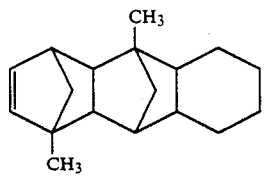 1,6-dimethylpentacyclo-
[6,6,1,1$^{3,6}$,0$^{2,7}$,0$^{9,14}$]-4-
hexadecene

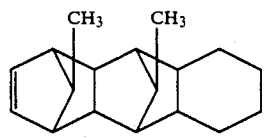 15,16-dimethylpentacyclo-
[6,6,1,1$^{3,6}$,0$^{2,7}$,0$^{9,14}$]-4-
hexadecene (6) heptacyclo-5-icosene or heptacyclo-5-heneicosene derivatives
such as

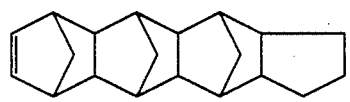 heptacyclo[8,7,0,1$^{2,9}$,1$^{4,7}$,
1$^{11,17}$,0$^{3,8}$,0$^{12,16}$]-5-
icosene

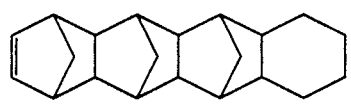 heptacyclo[8,7,0,1$^{2,9}$,1$^{4,7}$,
1$^{11,18}$,0$^{3,8}$,0$^{12,17}$]-5-
heneicosene (7) tricyclo[4,3,0,1$^{2,5}$]-3-decene derivatives such as

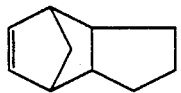 tricyclo[4,3,0,1$^{2,5}$]-3-decene

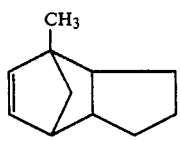 2-methyltricyclo[4,3,0,1$^{2,5}$]-
3-decene

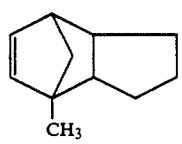 5-methyltricyclo[4,3,0,1$^{2,5}$]-
3-decene (8) tricyclo[4,4,0,1$^{2,5}$]-3-undecene such as

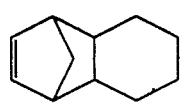 tricyclo[4,4,0,1$^{2,5}$]-3-
undecene

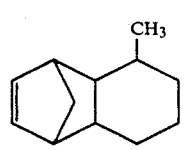 10-methyltricyclo[4,4,0,1$^{2,5}$]-
3-undecene (9) pentacyclo[6,5,1,1$^{3,6}$,0$^{2,7}$,0$^{9,13}$]-4-pentadecene derivatives
such as

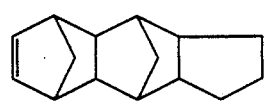 pentacyclo[6,5,1,1$^{3,6}$,0$^{2,7}$,
0$^{9,13}$]-4-pentadecene

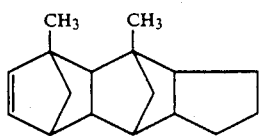 1,3-dimethylpentacyclo[6,5,1,1$^{3,6}$,0$^{2,7}$,0$^{9,13}$]-4-pentadecene

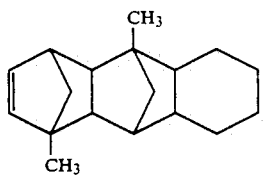 1,3-dimethylpentacyclo[6,5,1,1$^{3,6}$,0$^{2,7}$,0$^{9,13}$]-4-pentadecene

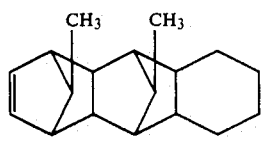 14,15-dimethylpentacyclo[6,5,1,1$^{3,6}$,0$^{2,7}$,0$^{9,13}$]-4-pentadecene

(10) diene compounds such as

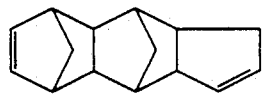 pentacyclo[6,5,1,1$^{3,6}$,0$^{2,7}$,0$^{9,13}$]-4,10-pentadecadiene

(11) pentacyclo[4,7,0,1$^{2,5}$,0$^{8,13}$,1$^{9,12}$]-3-pentadecene derivatives
such as

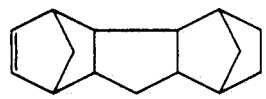 pentacyclo[4,7,0,1$^{2,5}$,0$^{8,13}$,1$^{9,12}$]-3-pentadecene

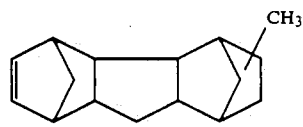 methyl-substituted pentacyclo[4,7,0,1$^{2,5}$,0$^{8,13}$,1$^{9,12}$]-3-pentadecene

(12) heptacyclo[7,8,0,1$^{3,6}$,0$^{2,7}$,1$^{10,17}$,0$^{11,16}$,1$^{12,15}$]-4-eicosene derivatives
such as

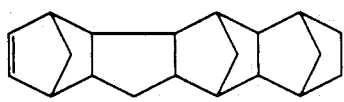 heptacyclo[7,8,0,1$^{3,6}$,0$^{2,7}$,1$^{10,17}$,0$^{11,16}$,1$^{12,15}$]-4-eicosene

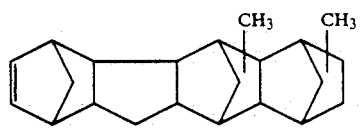 dimethyl-substituted heptacyclo[7,8,0,1$^{3,6}$,0$^{2,7}$,1$^{10,17}$,0$^{11,16}$,1$^{12,15}$]-4-eicosene

(13) nonacyclo[9,10,1,1$^{4,7}$,0$^{3,8}$,0$^{2,18}$,0$^{12,21}$,1$^{13,20}$,0$^{14,19}$,1$^{15,18}$]-5-pentacosene derivatives
such as

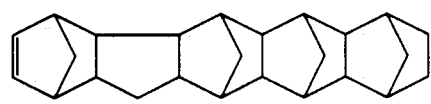 nonacyclo[9,10,1,1$^{4,7}$,0$^{3,8}$,0$^{2,18}$,0$^{12,21}$,1$^{13,20}$,0$^{14,19}$,1$^{15,18}$]-5-pentacosene

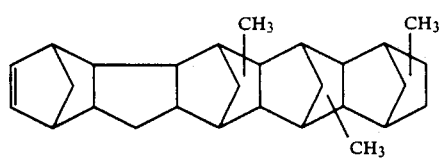 trimethyl substituted nonacyclo[9,10,1,1$^{4,7}$,0$^{3,8}$,0$^{2,18}$,0$^{12,21}$,1$^{13,20}$,0$^{14,19}$,1$^{15,18}$]-5-pentacosene Other examples include:

-continued
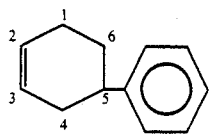 5-phenyl-bicyclo[2,2,1]hept-2-ene
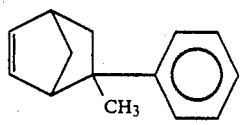 5-methyl-5-phenyl-bicyclo-[2,2,1]hept-2-ene
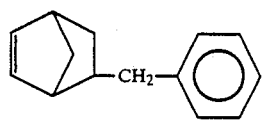 5-benzyl-bicyclo[2,2,1]hept-2-ene
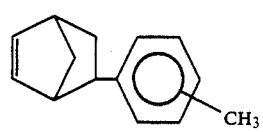 5-tolyl-bicyclo[2,2,1]hept-2-ene
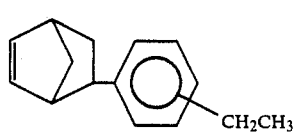 5-(ethylphenyl)-bicyclo-[2,2,1]hept-2-ene
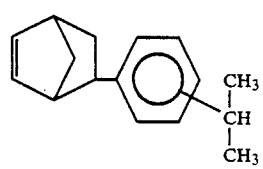 5-(isopropylphenyl)-bicyclo[2,2,1]hept-2-ene
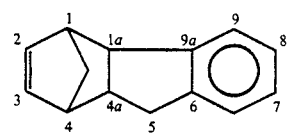 1,4-methano-1,1a,4,4a-tetrahydrofluolene
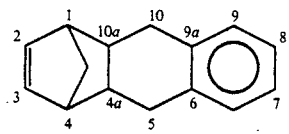 1,4-methano-1,4,4a,5,10a-hexahydroanthracene
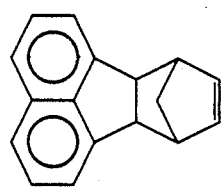 cyclopentadiene-acenaphthylene adduct
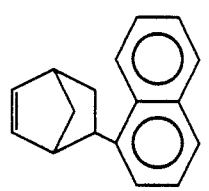 5-(α-naphthyl)-bicyclo-[2,2,1]-hept-2-ene, and

| | |
|---|---|
| 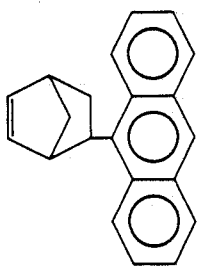 | 5-(acetoracenyl)-bicyclo-[2,2,1]-hept-2-ene. |

In addition to the above examples, further examples of the polycyclic olefins of formulae [I], [II] and [II-a] include octahydronaphthalenes such as 1,4,5,8-dimethano-1,2,3,4,4a,5,8,8a-octahydronaphthalene, 2-methyl-1,4,5,8-dimethano-1,2,3,4,4a,5,8,8a-octahydronaphthalene, 2-ethyl-1,4,5,8-dimethano-1,2,3,4,4a,5,8,8aoctahydronaphthalene, 2-propyl-1,4,5,8-dimethano1,2,3,4-,4a,5,8,8a-octahydronaphthalene, 2-hexyl1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-methyl-3-ethyl-1,4,5,8-dimethano1,2,3,4,4a,5,8,8a-octahydronaphthalene, 2-chloro1,4,5,8-dimethano-1,2,3,4,4a,5,8,8a-octahydronaphthalene, 2-bromo-1,4,5,8-dimethano-1,2,3,4,4a,5,8,8aoctahydronaphthalene, 2-fluoro-1,4,5,8-dimethano1,2,3,4,4a,5,8,8a-octahydronaphthalene, 2,3-dichloro1,4,5,8-dimethano-1,2,3,4,4a,5,8,8a-octahydronaphthalene, 2-cyclohexyl-1,4,5,8-dimethano-1,2,3,4,4a,5,8,8a-octahydronaphthalene, 2-n-butyl-1,4,5,8-dimethano1,2,3,4,4a,5,6,8a-octahydronaphthalene, and 2-isobutyl1,4,5,8-dimethano-1,2,3,4,4a,5,8,8a-octahydronaphthalene.

In the present invention, the cyclo-olefinic resin is at least one resin selected from the group consisting of (1-a) ring-opened polymers or ring-opened copolymers derived from the above cyclo-olefins, (1-b) hydrogenation products of these polymers or copolymers, and (2) addition polymers of ethylene with the above cyclo-olefins.

These polymers or copolymers and their hydrogenation products will be described in more detail.

The cyclo-olefin ring-opened polymers can be prepared by a known method by ring-opening polymerization of the cyclo-olefins of formula [I] or formula [III]. In the present invention, cyclo-olefinic ring-opened polymers prepared by using the above cyclo-olefins singly, and ring-opened copolymers prepared by ring-opening polymerizations of two or more cyclo-olefins may be used. Examples of such ring-opened polymers or copolymers are (co)polymers of 1,4,5,8-dimethano-1,2,3,4,4a,5,8,8a-octahydronaphthalenes with each other, and ring-opened copolymers of 1,4,5,8-dimethano-1,2,3,4,4a,5,8,8a-octahydronaphthalenes with norbornenes (bicyclo[2,2,1]-hept-2-enes).

In the cyclo-olefinic ring-opened polymers prepared as above, a double bond remains. The double bonds may be easily hydrogenated by known methods. In the present invention, hydrogenation products of the cyclo-olefin ring-opened (co)polymers so obtained may also be used. This hydrogenation will further improve thermal stability and weather resistance.

The ring-opened (co)polymers and their hydrogenation products of these (co)polymers used as the cyclo-olefin polymers in this invention will be described below taking up the cyclo-olefins of formula [II] as examples. It is thought that the cyclo-olefin of formula [II] reacts as described below and constitute the ring-opened (co)polymers and their hydrogenation products.

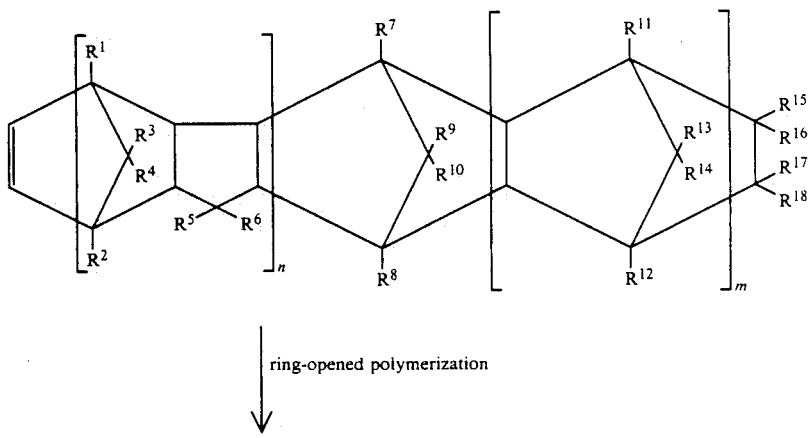

ring-opened polymerization

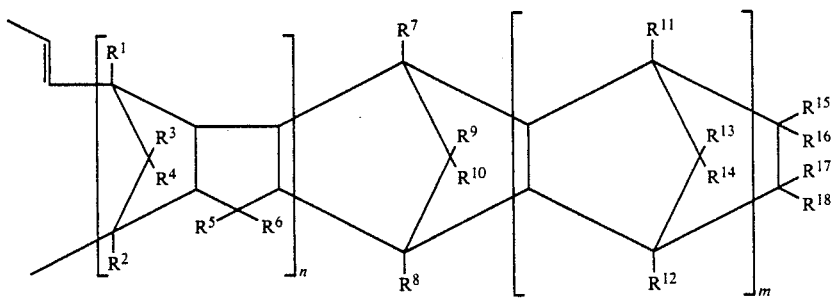

↓ hydrogenation

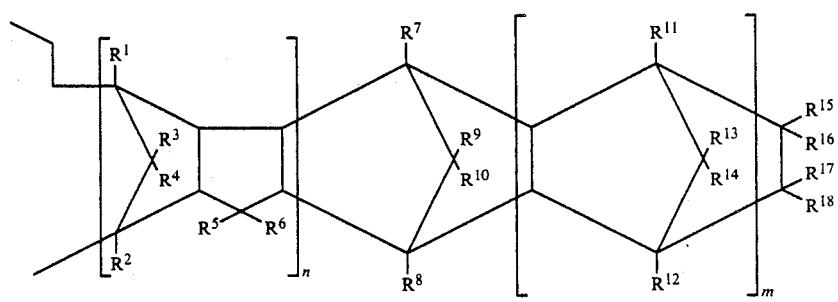

In the above formulae, $R^1$ to $R^{18}$, m and n are as defined in formula [II]. In the ring-opening polymerization, cyclo-olefins other than the cyclo-olefins of formula I], II] or [II-a] may be used. Examples of the other cyclo-olefins include cyclobutene, cyclopentene, cyclohexene, 3,4-dimethylcyclopentene, 3-methylcyclohexene, 2-(2-methylbutyl)-1-cyclohexane, 2,3,3a,7a-tetrahydro-4,7-methano-1H-indene and 3a,5,6,7a-tetrahydro-4,7-methano-1H-indene. The cyclo-olefin addition polymers used as the cyclo-olefinic resins in this invention are addition polymers of the cyclo-olefins of formula [I], [II] or and ethylene. In the cyclo-olefin addition polymers, the ratio of recurring units derived from ethylene to recurring units derived from the cyclo-olefin is usually from 10:90 to 90:10, preferably from 50:50 to from 75:25.

The cyclo-olefin addition polymers can be produced by polymerizing ethylene and a cyclo-olefin in a hydrocarbon medium in the presence of a catalyst formed from a hydrocarbon-soluble vanadium compound and a halogen-containing organoaluminum.

Such a polymerization is already known and is proposed, for example, in Japanese Laid-Open Patent Publication No. 168708/1985.

It is believed that in such a cyclo-olefin addition polymer, at least a part of the cyclo-olefin of formula II has the structure shown in the following formula and bonded randomly to recurring units derived from ethylene.

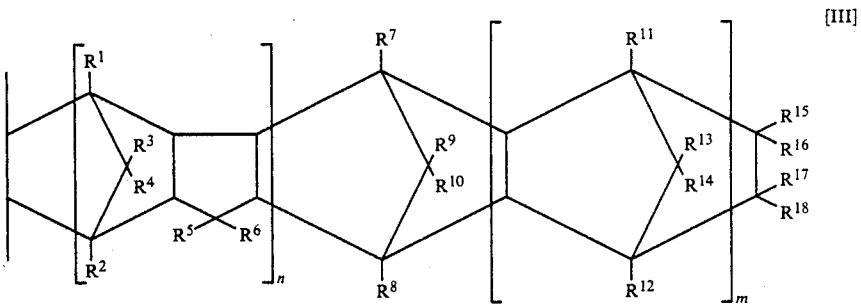

[III]

In formula [III], $R^1$ to $R^{18}$, m and n are the same as defined in formula [II].

In the cyclo-olefin addition polymers, the recurring units derived from ethylene and the recurring units derived from cyclo-olefin are arranged substantially linearly at random. That the cyclo-olefin addition polymers are substantially linear and have no gel-like crosslinkage can be determined from the fact that the addition polymers are completely soluble in decalin at 135° C.

The cyclo-olefin addition polymers used in this invention and a cyclo-olefin is obtained by addition-polymerization of the ethylene component and the cyclo-olefin component, and an alpha-olefin and a cyclo-olefin other than the cyclo-olefins represented by formula [I], [II] or [II-a] (other cyclo-olefins) so long as these additional olefin components do not impair the properties of the final addition polymer.

The alpha-olefin used may be linear or branched, and includes, for example, alpha-olefins having 3 to 20 carbon atoms such as propylene, 1-butene, 4-methyl-1-pentene, 1-hexene, 1-octene, 1-decene, 1-dodecene, 1-tetradecene, 1-hexadecene, 1-octadecene, and 1-eicosene. Of these, alpha-olefins having 3 to 15, particularly 3 to 10, carbon atoms are preferably used.

The term "other cyclo-olefins", as used herein, broadly denotes unsaturated polycyclic hydrocarbon compounds excluding the cyclo-olefins of formulae I, [II] and [II-a].

Specific examples of the other cyclo-olefins include cyclobutene, cyclopentene, cyclohexene, 3,4-dimethylcyclopentene, 3-methylcyclohexene, 2-(2-methylbutyl)-1-cyclohexene, styrene, alpha-methylstyrene, 2,3,3a,7a-tetrahydro-4,7-methano-1H-indene and 3a,5,6,7a-tetahydro-4,7-methano-1H-indene.

When the other cyclo-olefin has two or more double bonds within the molecule, those double bonds which remain unused in the addition polymerization may be hydrogenated for the purpose of improving weatherability.

For example, when the above addition polymerization is carried out and if required, hydrogenation is further carried out, the resulting cyclo-olefin addition polymer has an iodine number of usually not more than 5, mostly not more than 1.

$^{13}$C-NMR measurement of the resulting cyclo-olefin addition polymer leads to the determination that the starting cyclo-olefin has the structure of III, for example.

The resulting cyclo-olefin addition polymer has a chemically stable structure and excellent heat aging resistance. The cyclo-olefinic ring-opened (co)polymers (1-a) and their hydrogenation products (1-b) and the cyclo-olefin addition polymers (2) described above have an intrinsic viscosity, measured in decalin at 135° C., of 0.05 to 10 dl/g, preferably 0.08 to 5 dl/g.

These cyclo-olefin resins are generally amorphous or low-crystalline, preferably amorphous. Accordingly, they have good transparency. Specifically, these cyclo-olefin resins have a crystallinity, measured by X-ray, of 0 to 10%, preferably 0 to 7%, especially preferably 0 to 5%. They have a glass transition temperature (Tg) of usually 50° to 230° C., in most cases 70° to 210° C., and a heat-decomposition temperature of 350° to 420° C., in most cases 370° to 400° C.

As mechanical properties, they have a fluxural modulus of usually $1 \times 10^4$ to $5 \times 10^4$ kg/cm$^2$ and a flexural strength of usually 300 to 1500 kg/cm$^2$.

These cyclo-olefin polymers also have a density of 0.86 to 1.10 g/cm$^3$, mostly 0.88 to 1.08 g/cm$^3$, and a refractive index, measured in accordance with ASTM D542, of 1.47 to 1.58, mostly 1.48 to 1.56. Since they are substantially amorphous, they have a haze, determined by ASTM D1003, of usually not more than 20% and mostly not more than 10%.

As electrical properties, they have a dielectric constant (1 KHz), measured in accordance with ASTM D150, of 1.5 to 3.0, mostly 1.9 to 2.6, and a dielectric loss tangent of $9 \times 10^4$ to $8 \times 10^5$, mostly $3 \times 10^{-4}$ to $9 \times 10^{-5}$.

The cyclo-olefin resins [B] constituting the thermoplastic resin composition can be produced in accordance with the methods described in Japanese Laid-Open Patent Publications Nos. 168708/1985, 120816/1986, 115912/1986, 115916/1986, 271308/1986 and 272216/1986 and Japanese Patent Applications Nos. 95905/1986 and 95906/1986 by properly selecting the conditions.

Blending proportions

In the thermoplastic resin composition of this invention, the linear polyolefin [A] is present in a proportion of 5 to 90% by weight, preferably 10 to 60% by weight, especially preferably 20 to 50% by weight, the cyclo-olefin random copolymer B is present in a proportion of 95 to 10% by weight, preferably 90 to 40% by weight, especially preferably 80 to 50% by weight. In the resin composition of this invention, the total proportion of the linear polyolefin [A] and the cyclo-olefin resin [B] is 100% by weight.

the resin composition of the invention comprises the linear polyolefin A1 and the cyclo-olefin resin [B] as essential components and may further comprises a filler, a heat stabilizer, a weather resistance stabilizer, an antistatic agent, a slip agent, an antiblocking agent, an antihaze agent, a lubricant, a dye, a pigment, a natural oil, a synthetic oil and a wax in amounts which do not impair the object of this invention.

Process

Known methods may be applied to the production of the thermoplastic resin composition of this invention. For example, there may be used a melt-blending method by which the linear polyolefin A) and the cyclo-olefin resin [B] are separately produced and melt-kneaded in an extruder, or a method by which the polymers [A] and [B] in powder form are dry-blended by kneading with a Henschel mixer.

Since the thermoplastic resin composition contains the linear polyolefin [A] and the cyclo-olefin resin [B] in specific proportions, there can be obtained molded articles having the inherent excellent mechanical properties of the ultrahigh-molecular-weight polyolefin, and because its shrinkage during molding is low, there can be obtained molded articles having excellent dimensional stability and a well-balanced combination of self-lubricating property, molding dimensional stability. heat resistance and rigidity can be obtained. Such molded articles can also be utilized in applications requiring a high level of dimensional accuracy (class 4 or higher according to JIS B 1702). The applications which require such a high level of dimensional accuracy include, for example, gears, bearings, rollers, tape reels and keyboard substrates of various business machines for office use.

The following examples specifically illustrate the present invention.

EXAMPLE 1

Linear polyolefin powder

A polyethtylene powder having an intrinsic viscosity of 5.4 dl/g and a melting torque of 1.8 kg.cm and produced by a two-step polymerization method was used. This polyethylene powder was composed of 20% by weight of ultrahigh-molecular-weight polyethylene having an intrinsic viscosity of 30 dl/g and 80% by weight of low-molecular-weight polyethylene having an intrinsic viscosity of 0.7 dl/g.

The melting torque is the stress torque of a molten sample, measured at a temperature of 240° C. and a pressure of 5 kg/cm² with an amplitude of ±3° and a vibration number of 6 CPM by a JSR curelastomer (supplied by Imanaka Mechanical Industry, Co., Ltd.). This polyethylene powder had a crystallinity of 65%.

Cyclo-olefin resin powder

A powder of a random copolymer of ethylene and 1,4,5,8-dimethano-1,2,3,4,4a,5,8,8a-octahydronaphthalene

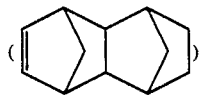

having an ethylene content measured by ¹³C-NMR, of 62 mole % was used. This copolymer had an intrinsic viscosity (135° C., decalin) of 0.47 dl/g, a TMA of 148° C., an MFR (measured in accordance with ASTM D1238 at 260° C. under a load of 2.16 kg) of 35 g/10 min.

Production of a thermoplastic resin composition

Twenty-five parts by weight of the linear polyolefin powder, 75 parts by weight of the cyclo-olefin resin powder, 0.6 part by weight of tetrakismethylene(3,5-di-tert-butyl-4-hydroxy)hydrocinnamate) (Irganox 1010, a tradename for a product of Ciba-Geigy), 0.1 part by weight of tetrakis(2,4-di-tert-butylphenyl)-4,4-biphenylene diphosphite (Sandstaf P-EPQ, a tradename for a product of Sandoz AG). and 0.12 part of calcium stearate (a product of Japan Oils and Fats Co., Ltd.) were mixed by a Henschel mixer (model 75l made by Mitsui Miike Seisakusho Co., Ltd.) at 870 rpm for 15 seconds and at 1740 rpm for 90 seconds. The mixture was then pelletized by using a twin screw extruder (PCM-45, made by Ikegai Tekko Co., Ltd) at a resin temperature of 240±5° C. and a screw rotating speed of 250 rpm using four strands to form pellets. The resulting pellets were molded by using an injection-molding machine (IS-55 supplied by Toshiba Kikai Co., Ltd.) under the following molding conditions to produce a rectangular plate (size 3mm ×120mm ×130 mm). Samples were taken from the central part of the resulting rectangular plate, and the properties of the rectangular plate were evaluated.

Injection-molding conditions

Cylinder temperature (° C.): 230/250/250/250
Injection pressure (kg/cm²) primary/secondary=1000/800
Screw rotating speed (rpm): 97
Mold temperature (°C.): 80

Methods of evaluating the properties of the sample (1) Tensile test In accordance with ASTM D 638. Test samples having the shape of ASTM No. 4 were used, the tensile strength at break point (TS: kg/cm²) and elongation at break point (EL: %) of the sample were measured at a pulling speed of 50 mm/min.

(2) Flexural modulus (kg/cm²)

In accordance with ASTM D 790. A test piece having a size of 3 mm× 12.7 mm×63.5 mm was used.

(3) Heat distortion temperature (°C.) Measured in accordance with ASTM D 648 using a heat distortion tester (supplied by Toyo Seiki Co., Test piece: 3 mm× 12.7mm ×127 mm
Load: 4.64 kg/cm²

(4) Coefficient of dynamic friction

By using a Matsubara-type abrasion tester (made by Toyo Baldwin Co.), the test was conducted for 30 minutes at a sliding speed of 12 m/min. under a compression load of 7.5 kg/cm², and the coefficient of friction was measured. The material which was rubbed was a stainless steel material, SUS 304. The sliding surface was used after it was worked to a roughness of 6 S.
Test piece: injection-molded, rectangular plate (130 mm× 120mm ×3 mm).

(5) Limited PV value

A Matsubara-type friction and abrasion tester (made by Toyo Baldwin Co.) was operated at a sliding speed of 12 m/min. under a compression increasing step wise from 2.5 kg/cm² to 25 kg/cm² at intervals of 2.5 kg/cm². Under each of the conditions, the operation was continued for 30 minutes. The PV value (load x speed) at which the resin was melted by the heat of friction was measured. The material against which the test piece was rubbed was a stainless steel material, SUS 304, and the sliding surface was used after it was worked to a roughness of 6 S.
Test piece: injection-molded rectangular plate (130 mm×120 mm×3 mm)

(6) Molding shrinkage (%)

The longitudinal and lateral sizes of a rectangular plate (130 mm× 120 mm×3 mm) obtained by injection molding were measured, and the shrinkage of the product based on the size of the mold was measured. The shrinkage (%) was calculated by the following equation.

$$\text{Shrinkage (\%)} = \frac{\left(\begin{array}{c}\text{size of}\\\text{the mold}\end{array}\right) - \left(\begin{array}{c}\text{size of}\\\text{the product}\end{array}\right)}{(\text{size of the mold})} \times 100$$

EXAMPLE 2

Example 1 was repeated except that the amount of the linear polyolefin powder blended was changed to 50 parts by weight, and the amount of the cyclo-olefin resin powder was changed to 50 parts by weight. The properties of the resulting rectangular plate were measured. The results are shown in Table 1.

Referential Example 1

Example 1 was repeated except that the linear polyolefin powder along was used, and pellets of the polyolefin alone were obtained. An injection-molded rectangular plate was obtained from the pellets, and the properties of the plate were measured as in Example 1. The results are shown in Table 1.

TABLE 1

| | Example 1 | Example 2 | Referential Example 1 |
|---|---|---|---|
| Tensile properties (the central and lateral directions alone) | | | |

TABLE 1-continued

| | Example 1 | Example 2 | Referential Example 1 |
|---|---|---|---|
| TS (kg/cm$^2$) | 350 | 330 | 480 |
| EL (%) | 6 | 5 | 10 |
| Flexural modulus E (kg/cm$^2$) | 2.6 × 10$^4$ | 2.5 × 10$^4$ | 1.7 × 10$^4$ |
| Heat distortion temperature (4.6 kg/cm$^2$) (° C.) | 118 | 100 | 80 |
| Coefficient of dynamic friction ($\mu$) (surface/back) | 0.15/0.13 | 0.16/0.16 | 0.15/0.15 |
| Limite PV value (kg/cm$^2$ m/min.) (surface/back) | >300/>300 | >300/>300 | >300/>300 |
| Shrinkage (%) (longitudinal/lateral) | 0.74/0.83 | 1.23/1.36 | 1.8/1.7 |

We claim:

1. A thermoplastic resin composition composed of [A] 5 to 90% by weight of a linear polyolefin having an intrinsic viscosity [$\eta$], measured in decalin at 135° C., of 1.0 to 15.0 and a crystallinity of at least and formed substantially of from 8 to 40% of an ultrahigh-molecular-weight polyolefin having an intrinsic viscosity [$\eta$], determined at 135° C., of 10 to 40 dl/g and to 92% of a low-molecular-weight to high-molecular-weight polyolefin having an intrinsic viscosity [$\eta$], measured in decalin at 135° C., of 0.1 to 5.0 dl/g, and [B] 95 to 10% by weight of at least one type of cyclo-olefin resin having an intrinsic viscosity, measured in decalin at 135° C., of 0.05 to 10 dl/g and a softening temperature of at least 70° C. and selected from ring-opened polymers and ring-opened copolymers derived from cyclo-olefins represented by the following formula [I],

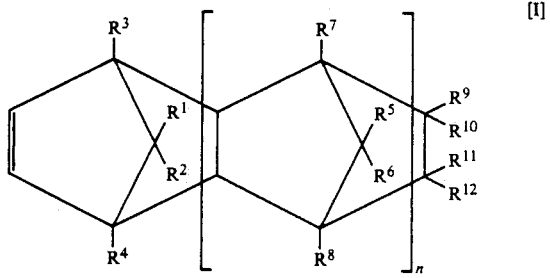

wherein n is 0 or a positive integer, $R^1$ to $R^{12}$, independently from each other, represent an atom or a group selected from the class consisting of a hydrogen atom, halogen atoms and hydrocarbon groups, $R^9$ to $R^{12}$ may be linked to each other to form a monocyclic or polycyclic group which may have a double bond, and $R^9$ and $R^{11}$, or and $R^{12}$, may each form an alkylidene group, hydrogenated products of said polymers or copolymers, and addition polymers of ethylene with the cyclo-olefins of formula [I].

2. A thermoplastic resin composition composed of
[A] 10 to 60% by weight of a linear polyolefin having an intrinsic viscosity [$\eta$], measured in decalin at 135° C., of 2.5 to 10.0 dl/g and a crystallinity of at least 55% and formed substantially of from 10 to 30% of an ultrahigh-molecular-weight polyolefin having an intrinsic viscosity [$\eta$], determined at 135° C., of 15 to 35 dl/g and 70 to 90% of a low-molecular-weight to high-molecular-weight polyolefin having an intrinsic viscosity [$\eta$], measured in decalin at 135° C., of 0.5 to 3.0 dl/g, and
[B] 90 to 40% by weight of at least one type of cyclo-olefin resin having an intrinsic viscosity, measured in decalin at 135° C., of 0.08 to 5 dl/g and a softening temperature of at least 70° C. and selected from ring-opened polymers and ring-opened copolymers derived from cyclo-olefins represented by the following formula [I],

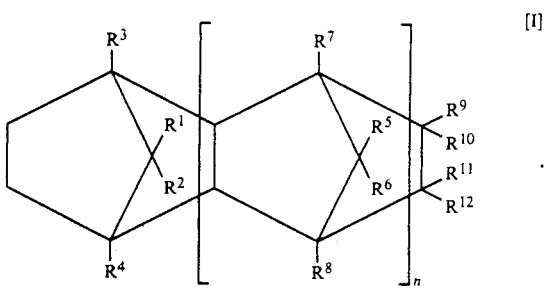

wherein n is 0 or a positive integer, $R^1$ to $R^{12}$, independently from each other, represent an atom or a group selected from the class consisting of a hydrogen atom, halogen atoms and hydrocarbon groups, $R^9$ to $R^{12}$ may be linked cyclic group which may have a double bond, and $R^9$ and $R^{11}$, or $R^{10}$ and $R^{12}$, may each form an alkylidene group,
hydrogenated products of said polymers or copolymers, and addition polymers of ethylene with the cyclo-olefins of formula [I1].

3. A thermoplastic resin composition composed of
[A] 1 20 to 50% by weight of a linear polyolefin having an intrinsic viscosity [$\eta$], measured in decalin at 135° C., of 3.0 to 7.0 and a crystallinity of at least 65% and formed substantially of from 15 to 25% of an ultrahigh-molecular-weight polyolefin having an intrinsic viscosity [$\eta$]), determined at 135° C., of 25 to 35 dl/g and 75 to 85% of a low-molecular-weight to high-molecular-weight polyolefin having an intrinsic viscosity [$\eta$], measured in decalin at 135° C., of 0.5 to 3.0 dl/g, and
[B] 80 to 50% by weight of at least one type of cyclo-olefin resin having an intrinsic viscosity, measured in decalin at 135° C., of 0.08 to 5 dl/g and a softening temperature of at least 70° C. and selected from ring-opened polymers and ring-opened copolymers derived from cyclo-olefins represented by the following formula [I],

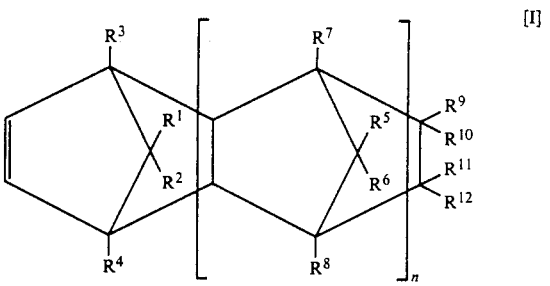

wherein n is 0 or a positive integer, $R^1$ to $R^{12}$, independently from each other, represent an atom or a group selected from the class consisting of a hydrogen atom, halogen atoms and hydrocarbon groups, $R^9$ to $R^{12}$ may be linked to each other to form a monocyclic or polycyclic group which may have a double bond, and $R^9$ and $R^{11}$, or $R^{10}$ and $R^{12}$, may each form an alkylidene group, hydrogenated products of said polymers or copolymers, and addition polymers of ethylene with the cyclo-olefins of formula I.

4. The composition of claim 3 in which the ultrahigh-molecular-weight polyolefin and the low-molecular-weight to high-molecular-weight polyolefin are homopolymers or copolymers of alpha-olefins selected from the group consisting of ethylene, propylene, 1-butene, 10petene, 1-hexene, 1-octene, 1-decene, 1-dodecene, 4-methyl-1-pentene and 3-methyl-1-pentene, and the cyclo-olefin resin is an addition polymer of the cyclo-olefin of formula [I] and ethylene.

5. The composition of claim 4 in which the linear polyolefin is obtained by a multistep polymerization method.

6. The composition of claim 5 which further comprises at least one component selected from the group consisting of a filler, a thermal stabilizer, a weather resistance stabilizer, an antistatic agent, a slip agent, an antiblocking agent, an antihaze agent, a lubricant, a dye, a pigment, a natural oil, a synthetic oil and a wax.

7. The composition of claim 4 in which the ultrahigh-molecular-weight polyolefin and the low-molecular-weight polyolefin to high-molecular-weight polyolefin constituting the linear polyolefin are homopolymers or copolymers of ethylene, and the cyclo-olefin resin is an addition polymer of ethylene and 1,4,5,8-dimethano-1,2,3,4,4a,5,8,8a-octahydronaphthalene.

8. The composition of claim 7 in which the linear polyolefin is obtained by a multistep polymerization method.

9. The composition of claim 5 which further comprises at least one component selected from the group consisting of a filler, a thermal stabilizer, a weather resistance stabilizer, an antistatic agent, a slip agent, an antiblocking agent, an antihaze agent, a lubricant, a dye, a pigment, a natural oil, a synthetic oil and a wax.

10. The composition of claim 7 in which in the cyclo-olefin/ethylene addition polymer, the recurring units derived from ethylene and the recurring units derived from the cyclo-olefin are bonded in a mole ratio of from 10:90 to 90:10.

11. The composition of claim 8 in which in the cyclo-olefin/ethylene addition polymer, the recurring units derived from ethylene and the recurring units derived from the cyclo-olefin are bonded in a mole ratio of from 10:90 to 90:10.

12. The composition of claim 9 in which in the cyclo-olefin/ethylene addition polymer, the recurring units derived from ethylene and the recurring units derived from the cyclo-olefin are bonded in a mole ratio of from 10:90 to 90:10.

13. The composition of claim 7 in which in the cyclo-olefin/ethylene addition polymer, the recurring units derived from ethylene and the recurring units derived from the cyclo-olefin are bonded in a mole ratio of from 50:50 to 75:25.

14. The composition of claim 8 in which in the cyclo-olefin/ethylene addition polymer, the recurring units derived from ethylene and the recurring units derived from the cyclo-olefin are bonded in a mole ratio of from 50:50 to 75:25.

15. The composition of claim 9 in which in the cyclo-olefin/ethylene addition polymer, the recurring units derived from ethylene and the recurring units derived from the cyclo-olefin are bonded in a mole ratio of from 50:50 to 75:25.

* * * * *

UNITED STATES PATENT AND TRADEMARK OFFICE
CERTIFICATE OF CORRECTION

PATENT NO. : 4,990,559
DATED : February 5, 1991
INVENTOR(S) : TAKESHI SHIRAKI, ET AL It is certified that error appears in the above-indentified patent and that said Letters Patent is hereby corrected as shown below:

Claim 1, Column 35, line 24, after " a crystallinity of at least" insert --45% --;

Claim 1, Column 35, line 27, before "to 92%" insert -- 60 --;

Claim 1, Column 35, line 56, before " and $R^{12}$" insert --$R^{10}$ --.

Claim 2, column 36, line 27, after "linked" insert --to each other to form a monocyclic or poly--.

Claim 3, column 36, line 35, after "[A]" and before "20" delete --1--;

Claim 3, column 36, line 40, after "[η]" delete ")".

Signed and Sealed this

Twenty-fourth Day of August, 1993

Attest:

Attesting Officer

BRUCE LEHMAN

Commissioner of Patents and Trademarks